(12) United States Patent
Matsuo

(10) Patent No.: US 8,964,330 B2
(45) Date of Patent: Feb. 24, 2015

(54) DISK DRIVE DEVICE

(71) Applicant: Samsung Electro-Mechanics Japan Advanced Tech. Co. Ltd., Fujieda, Shizuoka Prefecture (JP)

(72) Inventor: Kazuhiro Matsuo, Fujieda (JP)

(73) Assignee: Samsung Electro-Mechanics Japan Advanced Technology Co., Ltd., Fujieda, Shizuoka Prefecture (JP)

( * ) Notice: Subject to any disclaimer, the term of this patent is extended or adjusted under 35 U.S.C. 154(b) by 0 days.

(21) Appl. No.: 14/333,013

(22) Filed: Jul. 16, 2014

(65) Prior Publication Data

US 2015/0029614 A1 Jan. 29, 2015

(30) Foreign Application Priority Data

Jul. 23, 2013 (JP) .................................. 2013-152175

(51) Int. Cl.
*G11B 33/08* (2006.01)
*F16C 32/06* (2006.01)
*H02K 5/16* (2006.01)
*G11B 19/20* (2006.01)

(52) U.S. Cl.
CPC ................... *G11B 19/2036* (2013.01)
USPC ........................... 360/99.08; 384/114; 310/90

(58) Field of Classification Search
CPC ........... G11B 33/08; F16C 32/06; H02K 5/16
USPC ............... 360/99.08; 384/112, 114, 115, 120, 384/123; 310/90
See application file for complete search history.

(56) References Cited

U.S. PATENT DOCUMENTS

| 5,533,811 | A | | 7/1996 | Polch et al. |
|---|---|---|---|---|
| 5,876,124 | A | * | 3/1999 | Zang et al. .................... 384/107 |
| 6,246,136 | B1 | * | 6/2001 | Ichiyama ......................... 310/90 |
| 6,900,568 | B2 | * | 5/2005 | LeBlanc et al. ................. 310/90 |
| 7,435,001 | B2 | * | 10/2008 | Kainoh et al. ................. 384/100 |
| 8,107,195 | B2 | * | 1/2012 | Sugiki ........................... 360/224 |
| 8,472,132 | B2 | * | 6/2013 | Yamada et al. ............ 360/99.08 |
| 8,724,257 | B2 | * | 5/2014 | Sekii et al. ................. 360/99.08 |
| 8,773,816 | B1 | * | 7/2014 | Sato et al. .................. 360/99.08 |
| 8,794,839 | B2 | * | 8/2014 | Kimura et al. ................ 384/119 |
| 8,797,678 | B1 | * | 8/2014 | Watanabe et al. .......... 360/98.07 |
| 2009/0140587 | A1 | | 6/2009 | Popov et al. |
| 2009/0140588 | A1 | | 6/2009 | Drautz et al. |
| 2010/0277833 | A1 | | 11/2010 | Sugiki |
| 2010/0315742 | A1 | | 12/2010 | Kimura et al. |

(Continued)

FOREIGN PATENT DOCUMENTS

| JP | 2009136143 A | 6/2009 |
|---|---|---|
| JP | 2010286071 A | 12/2010 |

(Continued)

*Primary Examiner* — Angel Castro
(74) *Attorney, Agent, or Firm* — Holtz, Holtz, Goodman & Chick PC

(57) ABSTRACT

A disk drive device includes a chassis, a top cover fixed to a chassis, a rotating body on which a disk retained in a disk retaining space formed between the chassis and the top cover is to be mounted, and a bearing body that supports the rotating body in a freely rotatable manner relative to the chassis. The bearing body has a lubricant applied in a predetermined area, and a capturer that captures the vaporized lubricant from the gas-liquid interface is provided in a space in communication with the disk retaining space from the gas-liquid interface of the lubricant.

17 Claims, 3 Drawing Sheets

(56) References Cited

U.S. PATENT DOCUMENTS

| | | |
|---|---|---|
| 2010/0321823 A1 | 12/2010 | Oe et al. |
| 2012/0090163 A1 | 4/2012 | Kodama et al. |
| 2012/0093446 A1 | 4/2012 | Goto et al. |
| 2012/0183243 A1 | 7/2012 | Sugiki |
| 2013/0083427 A1 | 4/2013 | Iwasaki et al. |
| 2013/0163120 A1 | 6/2013 | Kodama et al. |
| 2013/0216166 A1 | 8/2013 | Kodama et al. |
| 2013/0234552 A1 | 9/2013 | Kodama et al. |
| 2013/0235489 A1 | 9/2013 | Aoshima |
| 2013/0242429 A1 | 9/2013 | Iwasaki et al. |
| 2013/0279043 A1 | 10/2013 | Kodama et al. |
| 2013/0322793 A1 | 12/2013 | Kodama et al. |

FOREIGN PATENT DOCUMENTS

| | | |
|---|---|---|
| JP | 2012087867 A | 5/2012 |
| JP | 2012089199 A | 5/2012 |
| JP | 2012104169 A | 5/2012 |

\* cited by examiner

DISK DRIVE DEVICE

BACKGROUND OF THE INVENTION

1. Field of the Invention

The present disclosure relates to a disk drive device.

2. Description of the Related Art

Disk drive devices like a hard disk drive that is a kind of rotating devices employ a fluid dynamic bearing which has a lubricant applied between a shaft body and a bearing body, and which supports a disk in a freely rotatable manner (see, for example, JP 2012-089199 A, JP 2012-104169 A, U.S. Pat. No. 5,533,811, JP 2009-136143 A, JP 2010-286071 A, and JP 2012-087867 A). According to disk drive devices built with the fluid dynamic bearing, it is necessary to manage the applied conditions of the lubricant, such as the quantity thereof, and the gas-liquid interface thereof, and to suppress a leakage of the lubricant to ensure the use of disk drive devices for a long time without causing an operation failure, etc.

Hence, in order to suppress a leakage of clean gas and an entrance of unclean gas, for example, JP 2012-089199 A and JP 2012-104169 A disclose a disk drive device having a bearing mechanism fixed to a recess with a bottom provided in the chassis.

According to disk drive devices having the fluid dynamic bearing, however, the lubricant is vaporized from the gas-liquid interface thereof, the vaporized lubricant sticks to a disk surface through a gap, etc., causing operation failures in disk reading/writing. The structures disclosed in the aforementioned Patent Documents still have a possibility of disk contamination due to the vaporized lubricant, which cause an operation failure of the disk drive device.

The present disclosure has been made in view of the aforementioned technical problem, and it is an objective of the present disclosure to provide a disk drive device which can prevent a lubricant from sticking to a disk surface, and which can suppress an occurrence of an operation failure.

SUMMARY OF THE INVENTION

To accomplish the above objective, a disk drive device according to a first aspect of the present disclosure includes: a chassis; a shaft having a first end fixed to the chassis; a top cover fixed to a second end of the shaft; a rotating body on which a recording disk is to be mounted, the recording disk being retained in a disk retaining space formed between the top cover and the chassis; and a bearing body that supports the rotating body in a freely rotatable manner relative to the chassis around the shaft, in which: the bearing body has a lubricant applied in a gap between the rotating body and the shaft; the lubricant has a first gas-liquid interface between the rotating body and the shaft at a second-end side in an axial direction of the shaft relative to the chassis; and a first capturer which is annular around the shaft and which captures the vaporized lubricant from the first gas-liquid interface is provided in a space in communication with the disk retaining space from the first gas-liquid interface.

To accomplish the above objective, a disk drive device according to a second aspect includes: a chassis; a shaft body including a shaft having a first end fixed to the chassis; a stator core fixed to the chassis around the shaft body, and including coils; a top cover fixed to a second end of the shaft; a rotating body on which a recording disk is to be mounted, and forms a first space that surrounds the stator core, the recording disk being retained in a disk retaining space formed between the top cover and the chassis; and a bearing body that supports the rotating body in a freely rotatable manner relative to the chassis around the shaft, in which: the bearing body has a lubricant applied in a gap between the shaft body and the rotating body; the lubricant has a second gas-liquid interface at an opposite side to the second end in an axial direction; the first space is in communication with the disk retaining space from the second gas-liquid interface; and a second capturer which is annular around the shaft body, and which captures the vaporized lubricant from the second gas-liquid interface is provided in the first space.

To accomplish the above objective, a disk drive device according to a third aspect of the present invention includes: a chassis; a shaft body including a shaft having a first end fixed to the chassis; a top cover fixed to a second end of the shaft; a rotating body on which a recording disk is to be mounted, the recording disk being retained in a disk retaining space formed between the top cover and the chassis; and a bearing body that supports the rotating body in a freely rotatable manner relative to the chassis around the shaft, in which: the bearing body has a lubricant applied in a gap between the rotating body and the shaft body; the lubricant has a gas-liquid interface between the shaft body and the rotating body; and an annular capturer which is annular around the shaft body and which captures the vaporized lubricant from the gas-liquid interface is provided in a space in communication with the disk retaining space from the gas-liquid interface.

DETAILED DESCRIPTION OF THE PREFERRED EMBODIMENTS

Figure 1:
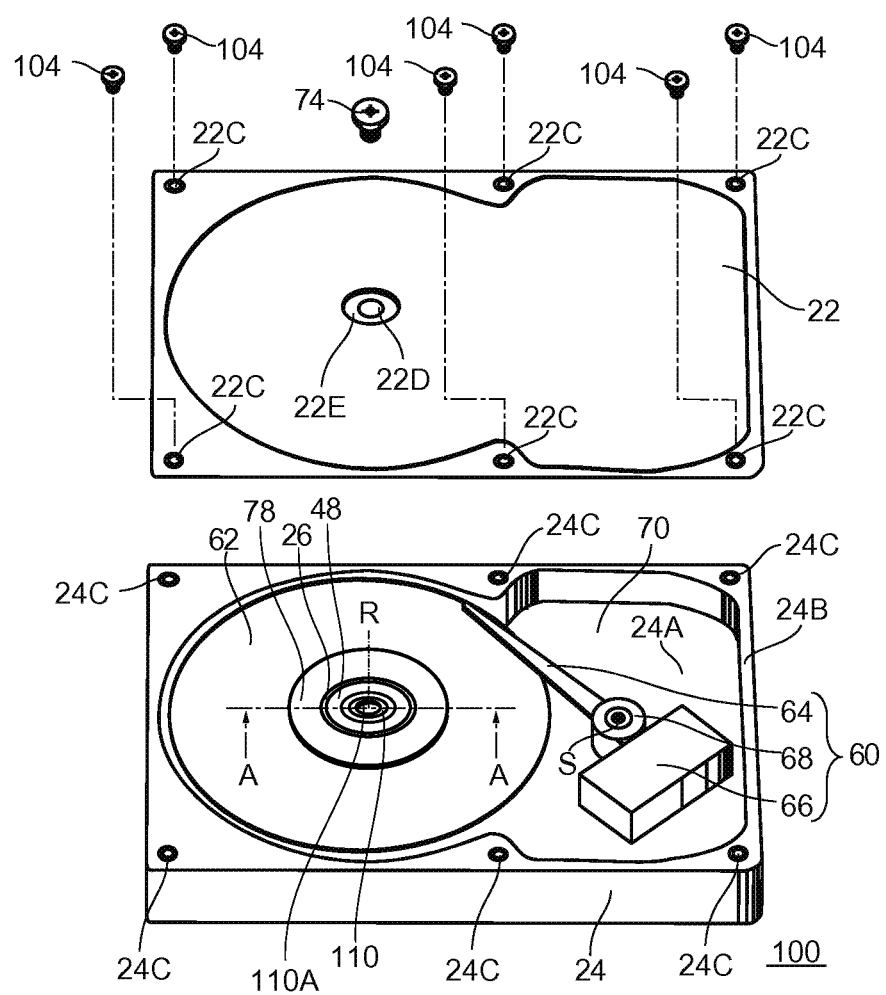
FIG. 1 is an exploded perspective view of a disk drive device according to an embodiment of the present disclosure.

A preferred embodiment of the present disclosure will be explained below with reference to the accompanying drawings. The same or equivalent structural element and member in respective drawings will be denoted by the same reference numeral, and the duplicated explanation will be omitted accordingly. In addition, the dimension of the member in each drawing is shown in an enlarged or scaled-down manner as needed to facilitate understanding to the present disclosure. Still further, a part of the member not important to explain the embodiment will be omitted in each drawing.

A disk drive device according to an embodiment is suitably utilized like a hard disk drive which is loaded with, for example, a magnetic recording disk that magnetically records data, and which rotates and drives the magnetic recording disk. For example, this disk drive device includes a rotating body that is attached to a stationary body in a manner freely rotatable through bearing means. The rotating body includes loading means to load a drive-target medium like the magnetic recording disk. The bearing means includes, for example, radial bearing means provided in either one of the stationary body and the rotating body. In addition, the bearing means includes thrust bearing means provided in either one of the stationary body and the rotating body. As an example, the thrust bearing means is located outwardly in a radial direction relative to the radial bearing means. As an example, the radial bearing means and the thrust bearing means produce dynamic pressure to a lubrication medium. The radial bearing means and the thrust bearing means may include, for example, a lubrication fluid. The disk drive device also includes rotating/driving means that applies rotation torque to the rotating body. This rotating/driving means is, for example, a brushless spindle motor. This rotating/driving means includes, for example, coils and a magnet.

(Embodiment)

An explanation will now be given with reference to FIGS. 1 to 3.

FIG. 1 is a perspective view illustrating a disk drive device 100 according to this embodiment. FIG. 1 illustrates a condition in which a top cover 22 is detached in order to facilitate understanding to the present invention. FIG. 2 is a cross-sectional view taken along a line A-A in FIG. 1 and mainly illustrates the left side relative to a rotation axis R. FIG. 2 illustrates a condition in which the top cover 22 is placed but a center screw 74 is not attached to facilitate understanding. FIG. 3 is an enlarged cross-sectional view illustrating the surrounding of a first gas-liquid interface 124 in FIG. 2 in an enlarged manner. Components not important to explain this embodiment are omitted in FIGS. 1 to 3.

The disk drive device 100 includes a chassis 24, a shaft 110, a hub 26 (unillustrated in FIG. 1), magnetic recording disks 62, a capturer support 48, a capturer 132, a clamper 78, a data reader/writer 60, the top cover 22, the center screw 74, and for example, six peripheral screws 104.

In the following explanation, a side at which the top cover 22 is mounted relative to the chassis 24 will be defined as an upper side. In addition, a direction along the rotation axis R of the rotating body, an arbitrary direction passing through the rotation axis R on a plane perpendicular to the rotation axis R, and an arbitrary direction on such a plane will be defined as an axial direction, a radial direction, and a planar direction, respectively. The notations of such directions are not intended to limit the posture of the disk drive device 100 when in use, and the disk drive device 100 can be used in any arbitrary posture.

The magnetic recording disk 62 is, for example, a 3.5-inch magnetic recording disk having a diameter of substantially 90 mm and formed of an aluminum alloy, and, a diameter of a center hole thereof is 25 mm. For example, three to six magnetic recording disks 62 are to be mounted on the hub 26, and are rotated together with the rotation of the hub 26. The magnetic recording disks 62 are fixed to the hub 26 by spacers 72 and the clamper 78. The clamper 78 and the spacers 72 will be explained later.

The chassis 24 includes a bottom plate 24A that forms the bottom of the disk drive device 100, and an outer circumference wall 24B formed along the outer periphery of the bottom plate 24A so as to surround an area where the magnetic recording disks 62 are to be mounted. For example, six screw holes 24C are provided in the top face of the outer circumference wall 24B. Note that the chassis may be referred to as a base in some cases.

The data reader/writer 60 includes an unillustrated recording/playing head, a swing arm 64, a voice coil motor 66, and a pivot assembly 68. The recoding/playing head is attached to the tip of the swing arm 64, records data in the magnetic recording disk 62, or reads the data therefrom. The pivot assembly 68 supports the swing arm 64 in a swingable manner to the chassis 24 around a head rotating axis S. The voice coil motor 66 allows the swing arm 64 to swing around the head rotating axis S to move the recording/playing head to a desired location over the top face of the magnetic recording disk 62. The voice coil motor 66 and the pivot assembly 68 are configured by a conventionally well-known technology of controlling the position of a head.

The top cover 22 is a thin plate formed in a substantially rectangular shape, and has, for example, six screw through-holes 22C provided at the periphery of the top cover 22, a cover protrusion 22E protruding downwardly toward the chassis 24, and a center hole 22D provided at the center of the cover protrusion 22E. The cover protrusion 22E is provided around the rotation axis R. The top cover 22 is formed by, for example, pressing an aluminum plate or an iron-steel plate into a predetermined shape. A surface processing like plating may be applied on the top cover 22 in order to suppress corrosion. The top cover 22 is fixed to the top face of the outer circumference wall 24B of the chassis 24 by, for example, the six peripheral screws 104. The six peripheral screws 104 correspond to the six screw through-holes 22C and the six screw holes 24C, respectively. In particular, the top cover 22 and the top face of the outer circumference wall 24B are fixed with each other so as to suppress a leak into the interior of the disk drive device 100 from the joined portion of the top cover 22 and the top face of the outer circumference wall 24B. The interior of the disk drive device 100 is, more specifically, a disk retaining space 70 surrounded by the bottom plate 24A of the chassis 24, the outer circumference wall 24B, and the top cover 22. This disk retaining space 70 is designed so as to be fully sealed, i.e., so as not to have a leak-in from the exterior and a leak-out to the exterior. The disk retaining space 70 is filled with clean air having particles eliminated. Hence, foreign materials like the particles are prevented from sticking to the magnetic recording disks 62 from the exterior of the disk retaining space 70, thereby improving the reliability of the operation of the disk drive device 100. The center screw 74 corresponds to a retainer hole 110A of the shaft 110. The top cover 22 is joined with the shaft 110 by causing the center screw 74 to pass all the way through the center hole 22D and to be engaged with the retainer hole 110A in a screw manner.

Figure 2:
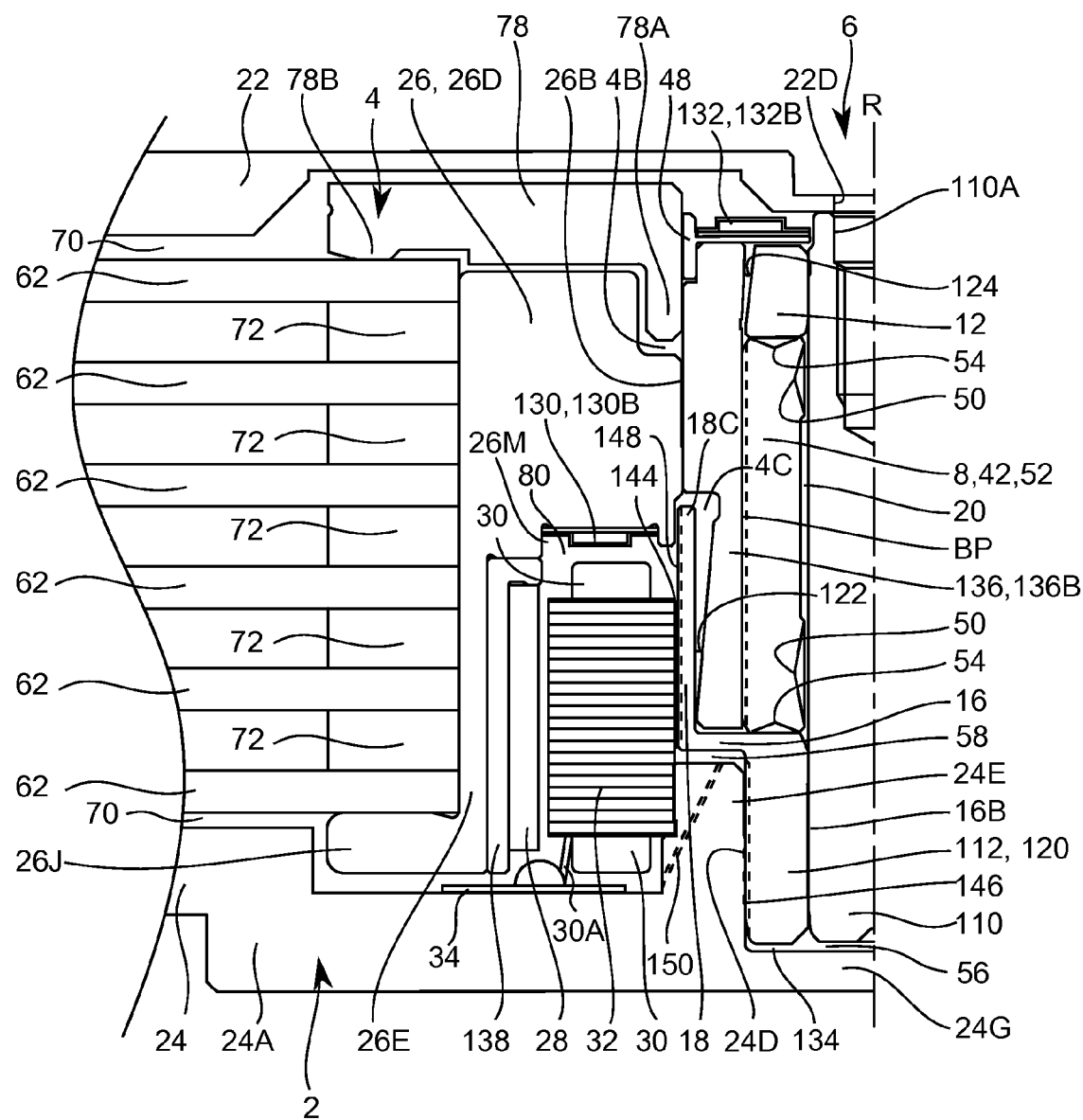
FIG. 2 is a cross-sectional view taken along a line A-A in FIG. 1.

FIG. 2 is a cross-sectional view taken along a line A-A in FIG. 1, and illustrates the left side relative to the rotation axis R. A stationary body 2 further includes a shaft body 6, a stator core 32, coils 30, and further a flexible printed circuit board 34. The shaft body 6 includes the shaft 110, a top flange 12 fixed to one-end side of the shaft 110, and an outer wall member 112 fixed to the other-end side of the shaft 110. The outer wall member 112 includes a flange part 16, a flange encircling part 18, and a shaft ring 120.

A rotating body 4 includes the hub 26, a bearing body 8, capturers 130, 132, the capturer support 48, a yoke 138, and a magnet 28.

The rotating body 4 and the stationary body 2 include, as a lubrication medium, a lubricant 20 continuously applied in some gaps between the shaft body 6 and the bearing body 8. The bearing body 8 includes a sleeve 42 and an outer cylinder 136. The sleeve 42 encircles the shaft 110 with a gap, and the outer cylinder 136 encircles and fixes the sleeve 42 and is fixed to the hub 26.

The shaft body 6, the bearing body 8, and the lubricant 20 form a fluid dynamic bearing unit 52 together with dynamic pressure generating grooves to be discussed later.

(Chassis)

The material of and the technique of forming the chassis 24 are not limited to any particular ones. In this embodiment, as an example, the chassis 24 is shaped by die-casting of an aluminum alloy as a single piece. The chassis 24 may be formed by, for example, pressing of a sheet metal, such as stainless steel or aluminum. In this case, the chassis 24 has a part including an embossed face formed by pressing. The chassis 24 may have a surface process layer like nickel plating. In addition, the chassis 24 may have a part formed of a resin. Still further, the chassis 24 may have a coating layer like an epoxy resin. The bottom plate 24A of the chassis 24 may be formed by laminating equal to or greater than two sheets.

The chassis 24 includes a protrusion 24E cylindrical around the rotation axis R as viewed from the top, and a bearing support 134 provided at the center of the protrusion 24E. The protrusion 24E protrudes toward the hub 26 from the upper face of the bottom plate 24A. The stator core 32 is fixed to the outer circumference of the protrusion 24E, and the upper face of the protrusion 24E faces the outer wall member 112 in the axial direction. The bearing support 134 includes a cylindrical inner circumference wall 24D recessed downwardly at the center of the protrusion 24E, and a bottom 24G provided at the lower end of the inner circumference wall 24D. The inner circumference wall 24D is formed cylindrically around the rotation axis R as viewed from the top, and the bottom 24G plugs and blocks off the lower end of the inner circumference wall 24D. That is, the bearing support 134 forms a recess with a bottom concaved downwardly from the upper face of the protrusion 24E. A part of the stationary portion of the fluid dynamic bearing unit 52 is fitted in the inner circumference wall 24D, and is fixed to the bearing support 134. The bottom 24G is formed integrally with the chassis 24 in a seamless manner. In this case, an excellent airtightness can be obtained. The bottom 24G may be formed separately from the chassis 24, and joined therewith later. In this case, the formation of the inner circumference wall 24D can be facilitated. In addition, the chassis 24 may be formed of an internal area including the protrusion 24E and an external area encircling the internal area. The internal area and the external area are separate pieces. In this case, it is desirable that the internal area should be formed of a material having a higher Young's modulus than that of the material of the external area.

(Stator Core)

The stator core 32 includes an annular part and, for example, 12 salient poles extending from the annular part outwardly in the radial direction. The stator core 32 is formed by, for example, laminating five to 30 magnetic steel sheets each having a thickness of 0.2 to 0.35 mm, and integrating those sheets together by caulking. In this embodiment, as an example, 20 magnetic steel sheets each having a thickness of 0.2 mm are laminated. A surface layer is formed on the surface of the stator core 32. An insulation coating, such as electrodeposition coating or powder coating, is applied to the surface of the stator core 32, i.e., this surface layer. The stator core may be a so-called solid core formed of magnetic powders conjugated in a predetermined shape.

The stator core 32 has the lower end of the inner circumference of the annular part engaged with the step provided at the protrusion 24E, and seated therewith, and the inner circumference of the annular part is joined with the step of the protrusion 24E by press-fitting, bonding or a combination thereof. The inner circumference of the annular part of the stator core 32 is bonded and fixed to the outer circumference of the flange encircling part 18 that is a larger-diameter part of the outer wall member 112 by a bond 144. According to this structure, multiple portions of the annular part of the stator core 32 in the axial direction are supported in a fixed manner, and thus a vibration of the stator core 32 can be suppressed in comparison with a case in which only a portion of the annular part is fixed. In this embodiment, as viewed in the axial direction, 50 to 90% of the inner circumference of the annular part of the stator core 32 is included in a joined area that is supported in a fixed manner. In this case, a vibration of the stator core 32 can be further suppressed.

(Coils)

The coils 30 are each formed by winding a conductor wire around each salient pole of the stator core 32 by a predetermined number of turns. The conductor wire is formed by, for example, covering the surface of a wire core like soft copper with an insulation layer like a urethane resin. A lubrication material is applied to the surface of the conductor wire to reduce a frictional resistance. An example lubrication material available is a polyamide compound. The coil 30 has a drawn line 30A which is electrically connected to a wiring conductor of the flexible printed circuit board 34 provided on the upper face of the bottom 24A of the chassis 24. When a drive current is caused to flow through the respective coils 30 from an unillustrated drive circuit through the flexible printed circuit board 34, filed magnetic fields are produced along the respective salient poles.

(Hub)

The hub 26 includes a disk portion 26D extending outwardly in the radial direction and provided with, at the center, an opening 26B passing all the way through in the axial direction, an engage portion 26E including an outer circumference that extends downwardly in the axial direction from the outer circumference of the disk portion 26D, and a mount portion 26J extending outwardly in the radial direction from the lower outer circumference of the engage portion 26E. The center hole of the disk-shape magnetic recording disk 62 is engaged with the engage portion 26E of the hub 26, and the magnetic recording disk 62 is mounted on the mount portion 26J.

The opening 26B, the disk portion 26D, the engage portion 26E, and the mount portion 26J are formed coaxially and annularly around the rotation axis R relative to each other. As a result, the hub 26 is formed in a substantially cup shape. The disk portion 26D, the engage portion 26E, and the mount portion 26J are formed integrally with each other. The hub 26 is formed of, for example, a non-ferrous material like an aluminum alloy, a ferrous material like stainless steel, or a resin material like liquid crystal polymer, or, a composite material thereof. The hub 26 may have a surface covering layer by coating or plating to suppress, for example, a peeling of the surface.

(Spacers)

As explained above, the six magnetic recording disks 62 are fixed to the hub 26 by the spacers 72 and the clamper 78. In order to separate the respective magnetic recording disks 62, the spacers 72 are each provided between the lower magnetic recording disk 62 and the upper magnetic recording disk 62. Each spacer 72 is in a hollow ring shape, and has the inner circumference engaged with the engage portion 26E. The spacer 72 is formed of, for example, a metal material like stainless steel SUS 303 and by cutting and machining.

(Clamper)

The clamper 78 is in a hollow disk shape having an outer periphery and an inner periphery, and includes a holding portion 78B provided at the lower end of the outer periphery, and an annular extended portion 78A extending outwardly in the axial direction toward the chassis 24 from the inner periphery. The clamper 78 has the bottom of the extended portion 78A located below the bottom of the holding portion 78B in the axial direction. As an example, the clamper 78 is formed by cutting a metal like stainless steel SUS 303. The clamper 78 is fastened to the upper face of the hub 26 by an unillustrated fastener like a screw. Hence, the holding portion 78B of the clamper 78 holds the uppermost magnetic recording disk 62 from the upper space, thereby preventing the magnetic recording disk 62 from being detached from the hub 26.

The rotating body 4 is formed with a rotating-body recess 4B which is an annular recess concaved in the opening 26B of the hub 26 in the axial direction toward the chassis 26, and into which the extended portion 78A of the clamper 78 enters. The rotating-body recess 4B may be provided in the outer circumference of the upper end face of the outer cylinder 136 of the fluid dynamic bearing unit 52 instead of the hub 26. The inner periphery of the extended portion 78A abuts the outer circumference of the outer cylinder 136 of the fluid dynamic bearing unit 52 so as to position the clamper 78 easily. The extended portion 78A may be formed so as to abut the inner circumference of the hub 26 instead of the outer cylinder 136.

(Yoke)

The yoke 138 is formed in a cylindrical shape around the rotation axis, and includes a hollow cylinder portion, and a extended portion extending inwardly in the radial direction from the upper end of the cylinder portion. The yoke 138 is formed by, for example, pressing or cutting and machining of a ferrous material with soft magnetism. A surface layer, such as plating or coating, may be formed on the surface of the yoke 138. The yoke 138 has an inner circumference of the cylinder portion bonded and fixed with the magnet 28. The lower end of the extended portion abuts the upper end of the magnet 28. The yoke 138 has the outer circumference of the cylinder portion bonded and fixed with the inner circumference of the engage portion 26E of the hub 26. The extended portion of the yoke 138 abuts the lower face of the hub 26.

(Magnet)

The magnet 28 is a hollow ring, and has, for example, an outer circumference bonded to the inner circumference of the yoke 138. The magnet 28 is formed of, for example, a ferrite-based magnetic material or a rare-earth magnetic material. The magnet 28 contains a resin like polyamide as a binder. The magnet 28 may be formed by laminating a ferrite-based magnetic layer and a rare-earth magnetic layer. A surface layer formed by, for example, electrodeposition coating or spray painting is formed on the surface of the magnet 28. The surface layer suppresses an oxidization of the magnet 28, or suppresses a peeling of the surface of the magnet 28. For example, eight or 16 magnetic poles are provided on the inner circumference of the magnet 28 in the circumferential direction, and the inner circumference of the magnet 28 faces with the outer circumferences of the salient poles of the core 32 in the radial direction with respective gaps. The height dimension of the magnet 28, i.e., the thickness may be larger than the thickness of the stator core 32.

(Fluid Dynamic Bearing Unit)

The shaft body 6, the bearing body 8, and the lubricant 20 further form the fluid dynamic bearing unit 52. The fluid dynamic bearing unit 52 includes gas-liquid interfaces of the lubricant 20 with ambient gas in a gap between the shaft body 6 and the bearing body 8. In this embodiment, a second gas-liquid interface 122 to be discussed later that is a chassis-side gas-liquid interface is exposed in an area held between the chassis 24 and the hub 26. In addition, the fluid dynamic bearing unit 52 has a first gas-liquid interface 124 to be discussed later that is a hub-side gas-liquid interface exposed in an open area at a distant side of the hub 26 from the chassis 24 in the axial direction.

(Shaft Body)

First, an explanation will be given of the structure of the shaft body 6 in detail. The shaft body 6 includes the outer wall member 112, the shaft 110, and the top flange 12.

(Outer Wall Member)

The outer wall member 112 includes the flange part 16, the flange encircling part 18, and the shaft ring 120. The flange encircling part 18 protrudes upwardly from the outer circumference of the flange part 16 toward the hub 26. The shaft ring 120 protrudes downwardly from the inner circumference of the flange part 16 toward the chassis 24. The flange part 16, the flange encircling part 18, and the shaft ring 120 are formed annularly and coaxially with each other along the rotation axis R. A shaft insertion hole 16B coaxial with the rotation axis R is formed in the respective centers of the flange part 16 and the shaft ring 120. For example, the outer wall member 112 has the flange part 16, the flange encircling part 18, and the shaft ring 120 formed integrally one another. In this case, the manufacturing error of the outer wall member 112 and the shaft ring 120 can be reduced, and a joining work can be eliminated. In addition, a deformation of the outer wall member 112 against shock load can be suppressed.

In view of other aspects, the outer wall member 112 forms the outer wall of the stationary part of the fluid dynamic bearing unit 52, the shaft ring 120 is a small-diameter part of the outer wall member 112, and the flange encircling part 18 is a large-diameter part of the outer wall member 112. The outer wall member 112 is formed by, for example, cutting and machining a metal like stainless steel SUS 430 or brass. Depending on the application of the disk drive device 100 or the restriction over the designing thereof, the outer wall member 112 may be formed of other materials like a resin, and may be formed by other techniques, such as pressing and molding.

The flange encircling part 18 has an upper end 18C entering an annular recess 4C provided in the lower face of the rotating body 4 and concaved upwardly in the axial direction. The annular recess 4C is formed by, for example, the inner circumference of the hub 26, and the outer circumference of the outer cylinder 136, and is opened downwardly. The gap in the radial direction and in the axial direction between the upper end 18C of the flange encircling part 18 and the annular recess 4C form a labyrinth which suppresses a dispersion of the lubricant 20 vaporized from the gas-liquid interface 122.

(Shaft)

The shaft 110 is a substantially cylindrical member extending in the axial direction along the rotation axis R, and is formed by, for example, cutting and machining or grinding of a ferrous material, such as stainless steel SUS 420 J2, SUS 430, or SUS 303. The shaft 110 may be hardened to enhance the hardness. The shaft 110 may have the outer circumference thereof and the lower face of the top flange 12 polished in order to improve the dimensional precision. The shaft 110 may be formed of other materials like a resin, and may be formed by other techniques, such as pressing and molding.

(Top Flange)

The top flange 12 is an annular member as viewed from the top, and is provided at one-end side of the shaft 110 distant from the chassis 24. The top flange 12 is disposed so as to cover the upper face of the sleeve 42 in the axial direction with a gap, and faces the outer cylinder 136 in the radial direction with a gap. The outer circumference of the top flange 12 has a tapered face having a distance from the rotation axis R in the radial direction becoming large as becoming close to the chassis 24.

The top flange 12 and the shaft 110 are formed as separate pieces, and are fixed together by, for example, bonding. In this case, the manufacturing of the top flange 12 and that of the shaft 110 become easy. The shaft 110 and the top flange 12 may be formed integrally with each other depending on the application and the restriction over the designing. In this case, the manufacturing error between the shaft 110 and the top flange 12 can be reduced, and a joining work can be eliminated.

The shaft 110 has the other end fitted in the shaft insertion hole 16B of the outer wall member 112, and is fixed thereto by, for example, interference fitting. This interference fitting is realized by, for example, press-fitting the shaft 110 into the shaft insertion hole 16B, shrink fitting, or fitting the shaft 110 into the shaft insertion hole 16B with the shaft 110 being cooled by a liquid nitrogen, and then letting the shaft 110 to be a normal temperature. This interference fitting may be combined with bonding.

In addition, the shaft 110 is formed with the retainer hole 110A at the one end which retains a fastener like the center screw 74.

(Bearing Body)

Next, a structure of the bearing body 8 will be explained in detail. The bearing body 8 includes the substantially cylindrical sleeve 42 encircling the middle portion of the shaft 110, i.e., the portion between the top flange 12 and the flange part 16, and the substantially cylindrical outer cylinder 136. The sleeve 42 is joined with the outer cylinder 136, and the outer cylinder 136 is joined with the hub 26. In other words, the sleeve 42 is fixed to the hub 26 through the outer cylinder 136. The upper end of the sleeve 42 faces the lower face of the top flange 12 with a gap in the axial direction, and the lower end of the sleeve 42 faces the upper face of the flange part 16 with a gap in the axial direction. According to such a structure, the sleeve 42 is rotatable relative to the shaft 110, and thus the hub 26 joined with the sleeve 42 is supported in a freely rotatable manner to the chassis 24.

The bearing body 8 is formed by, for example, cutting and machining of a metal like stainless steel SUS 430 or brass. The bearing body 8 may have a surface layer formed by, for example, electroless nickel plating.

(Sleeve)

The sleeve 42 is in a substantially hollow cylindrical shape, and the inner circumference of the sleeve 42 encircles the shaft 110 with a gap. A pair of radial dynamic pressure bearing portions distant from each other in the axial direction are provided in the gap between the inner circumference of the sleeve 42 and the shaft 110 in the radial direction. In the inner circumference of sleeve 42, the portions corresponding to the radial dynamic pressure bearing portions are provided with radial dynamic pressure generating grooves 50 that generate radial dynamic pressures. The radial dynamic pressure generating grooves 50 may be provided in the outer circumference of the shaft 110 instead of the sleeve 42. A lubricant retainer concaved outwardly in the radial direction is provided between the radial dynamic pressure bearing portions 50 in the inner circumference of the sleeve 42.

(Outer Cylinder)

The outer cylinder 136 is in a substantially hollow cylindrical shape, has the inner circumference encircling the sleeve 42, and joined with the sleeve 42 by bonding. The outer cylinder 136 has an upper portion of the outer circumference fixed to the opening 26B provided in the center of the hub 26 in the axial direction by shrink fitting. The outer cylinder 136 may be fixed to the hub 26 by other techniques like press-fitting. A bond to improve the air-tightness may be applied to the joined portion between the outer cylinder 136 and the hub 26. The outer cylinder 136 includes an extended part 136B which extends toward the flange part 16 and enters to the interior of the flange encircling part 18. The extended part 136B faces the flange encircling part 18 with a gap in the radial direction, and faces the outer wall member 112 in the axial direction.

(Communication Channel)

Still further, the sleeve 42 includes a communication channel BP which is formed in the outer circumference of the sleeve 42, runs in the axial direction, and causes two spaces formed outwardly in the axial direction from the upper end face of the sleeve 42 and the lower end face thereof to be in communication with each other. The communication channel BP includes a groove running between the upper end of the sleeve 42 and the lower end thereof in the outer circumference in the axial direction.

(Thrust Opposing Portions)

A first thrust opposing portion is provided in a gap in the axial direction between the lower face of the top flange 12 and the upper face of the sleeve 42. First thrust dynamic pressure generating grooves 54 are provided in the area of the sleeve 42 corresponding to the first thrust opposing portion. The first thrust dynamic pressure generating grooves 54 may be provided in the lower face of the top flange 12 instead of the sleeve 42.

A second thrust opposing portion is provided in a gap in the axial direction between the upper face of the flange 16 and the lower face of the sleeve 42. Second thrust dynamic pressure generating grooves 54 are provided in the area of the sleeve 42 corresponding to the second thrust opposing portion. The second thrust dynamic pressure generating grooves 54 may be provided in the upper face of the flange 16 instead of the sleeve 42.

(Dynamic Pressure Generating Grooves)

The radial dynamic pressure generating grooves 50 are formed in, for example, a herringbone shape, but may be formed in other shapes like a spiral shape. The thrust dynamic pressure generating grooves 54 are formed in, for example, a spiral shape, but may be formed in other shapes like a herringbone shape. Those dynamic pressure generating grooves 50, 54 are formed by, for example, pressing, ball rolling, electro-chemical machining, or cutting. Those dynamic pressure generating grooves 50, 54 may be formed by different techniques from each other.

(First Capillary Seal)

A tapered space gradually becoming widespread toward the upper space in the axial direction is formed in the gap between the outer circumference of the top flange 12 and the inner circumference of the outer cylinder 136 in the radial direction. The first gas-liquid interface 124 of the lubricant 20 contacts that outer circumference and that inner circumference, and forms a first capillary seal that suppresses a dispersion of the lubricant 20 by capillary force.

(Second Capillary Seal)

A tapered space gradually becoming widespread toward the upper space in the axial direction is formed in the gap between the outer circumference of the extended part 136B and the inner circumference of the flange encircling part 18 in the radial direction. The second gas-liquid interface 122 of the lubricant 20 contacts that outer circumference and that inner circumference, and forms a second capillary seal that suppresses a dispersion of the lubricant 20 by capillary force.

(Lubricant)

The lubricant 20 is continuously applied in the gap between the bearing body 8 and the shaft body 6 from the first gas-liquid interface 124 to the second gas-liquid interface 122. More specifically, the lubricant 20 is applied in areas including the first capillary seal, the gap between the top flange 12 and the sleeve 42, the gap between the sleeve 42 and the shaft 110 in the radial direction, the gap between the sleeve 42 and the flange part 16, the gap between the extended part 136B and the flange part 16, and the second capillary seal. In addition, the lubricant 20 is continuously applied in an area including the communication channel BP between the first gas-liquid interface 124 and the second gas-liquid interface 122.

The lubricant 20 has a fluorescent material added to the base oil. Hence, when the lubricant 20 leaks from the gap between components, if irradiated with light of a predetermined wavelength, such a leakage can be easily found.

(Fluid Dynamic Bearing Unit)

An explanation will now be given of the operation of the fluid dynamic bearing unit 52. When the bearing body 8 rotates relative to the shaft body 6, the radial dynamic pressure generating grooves 50 and the thrust dynamic pressure generating grooves 54 generate dynamic pressures to the lubricant 20. Such dynamic pressures support the rotating body 4 connected to the bearing body 8 in the radial direction and the axial direction so as not to contact the stationary body 2 joined with the shaft body 6.

(Bearing Fix)

The fluid dynamic bearing unit 52 has the outer circumference of the shaft ring 120 which is the small-diameter part of the outer wall member 112 and is, for example, bonded to the inner circumference wall 24D of the bearing support 134, thereby being fixed to the chassis 24. In addition, the fluid dynamic bearing unit 52 has the outer circumference of the flange encircling part 18 that is the large-diameter part of the outer wall member 112 bonded to the inner circumference of the annular part of the stator core 32 by a bond 144, thus being fixed. The fluid dynamic bearing unit 52 has, in stationary portions, multiple portions apart from each other in the axial direction or in the radial direction and supported by the chassis 24 in a fixed manner. Hence, when shock is applied, a deformation of those supported portions can be suppressed. The fluid dynamic bearing unit 52 has the outer cylinder 136 which is a part of the rotating portion and which is bonded and fixed to the opening 26B of the hub 26. As a result, the fluid dynamic bearing unit 52 supports the hub 26 in a freely rotatable manner relative to the chassis 24.

(Gas Channel)

A gas channel 146 that is a recess running in the axial direction is formed in the outer circumference of the shaft ring 120 of the outer wall member 112. The gas channel 146 causes a room 56 present below the lower end of the shaft 110 and a room 58 present below the lower end of the flange part 16 to be in communication with each other. Hence, the gas present in the room 56 can be drawn to the room 58 through the gas channel 146. The gas channel 146 may be formed in the inner circumference wall 24D of the bearing support 134.

(Degassing Structure)

A core retaining space 80 that retains the stator core 32 and the coils 30 is provided between the hub 26 of the rotating body 4 and the chassis 24 of the stationary body 2. The core retaining space 80 is in communication with the disk retaining space 70 through gaps between the hub 26 and the chassis 24.

In order to draw the gas in the space 58 to the core retaining space 80, a gas channel can be provided which causes the space 58 and the core retaining space 80 to be in communication with each other. Such a gas channel may be formed as a gap between components or as a recess or a hole formed in a component. In this embodiment, a gas channel 148 that is a recess running in the axial direction is formed in the flange encircling part 18 of the outer wall member 112, and a gas channel 150 is formed in the protrusion 24E. The gas channel 150 is formed as a through-hole passing all the way through between the end face of the protrusion 24E exposed in the space 58 and the side face exposed in the core retaining space 80. The gas channel 148 and the gas channel 150 allow the gas present in the space 58 to be drawn in the core retaining space 80. By providing the gas channel 148 and the gas channel 150, the presenting gas can be further easily drawn. Only either one of the gas channel 148 and the gas channel 150 can be provided, and in this case, the labor work of machining can be reduced.

(Capturer)

A capturer that captures mists of the lubricant 20 and the gas thereof dispersed from the gas-liquid interface is provided in a space between the rotating body 4 and the stationary body 2 and in communication with the disk retaining space 70 from the gas-liquid interface of the lubricant 20. The capturer captures the mists and the vaporized components dispersed from an area where the lubricant 20 is applied, thereby preventing such mists, etc., from sticking to the magnetic recording disks 62. The capturer is not limited to any particular one, but for example, a porous material and a charcoal filter can be applied.

(First Capturer)

Figure 3:
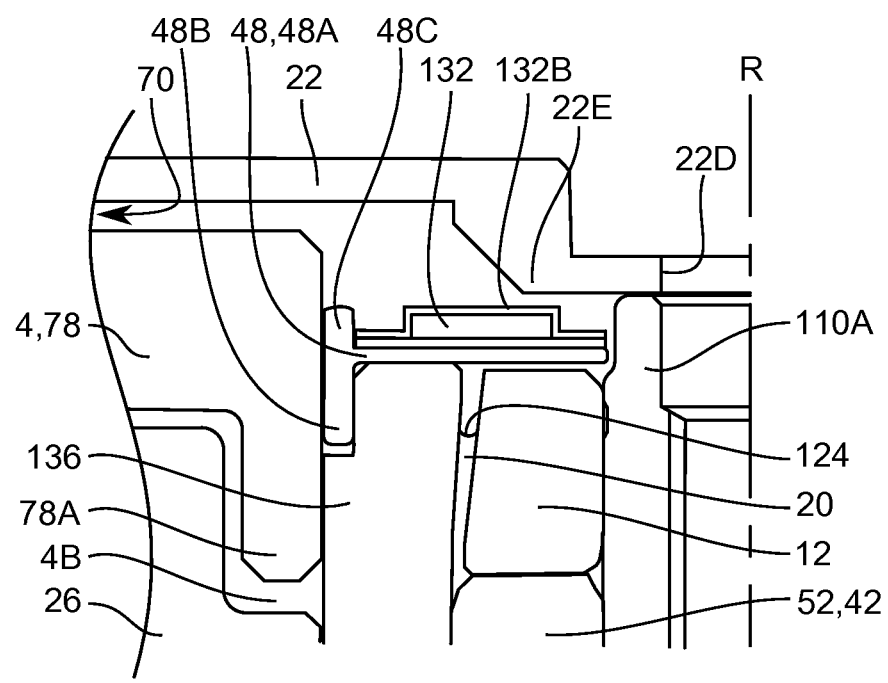
FIG. 3 is an enlarged cross-sectional view illustrating the surrounding of a first gas-liquid interface in FIG. 2 in an enlarged manner.

FIG. 3 is an enlarged cross-sectional view illustrating the surroundings of the first gas-liquid interface 124 in FIG. 2 in an enlarged manner. The fluid dynamic bearing unit 52 includes the first gas-liquid interface 124 near an area of the fluid dynamic bearing unit 52 contacting the top cover 22. The capturer 132 is provided between the fluid dynamic bearing unit 52 and the top cover 22. In view of other aspects, the capturer 132 overlaps the fluid dynamic bearing unit 52 in the axial direction. The lower face of the capturer 132 is disposed so as to cover the upper face of the top flange 12 of the fluid dynamic bearing unit 52 with a relatively small gap, and thus the capturer 132 and the top flange 12 of the fluid dynamic bearing unit 52 narrow down a channel in communication with the disk retaining space 70 from the first gas-liquid interface 124. By narrowing down the channel in this manner, the vaporized lubricant 20 from the first gas-liquid interface 124 can be prevented from diffusing to the disk retaining space 70. In addition, the capturer 132 includes a lubricant absorbing material like a porous material or a charcoal filter, captures the diffusing components of the lubricant 20, and further suppresses a diffusion of the vaporized lubricant to the disk retaining space 70.

The capturer 132 includes an annular capturer projection 132B projecting upwardly toward the top cover 22, and the capturer projection 132B and the cover protrusion 22E narrow down a channel in communication with the disk retaining space 70 from the first gas-liquid interface 124.

(Capturer Support)

The capturer 132 is fixed to the upper end face of the outer cylinder 136 of the rotating body 4 through the capturer support 48. As a result, the capturer 132 rotates together with the rotating body 4. The capture 132 may be fixed to, for example, the top flange 12 of the stationary body 2. The capturer support 48 is a hollow ring shape as viewed from the top, and includes a seat 48A in a disk shape where the capturer 132 is seated, a cylindrical wall 48B in a hollow cylindrical shape extending downwardly toward the chassis 24 from the outer circumference of the seat 48A, and a cylindrical wall 48C in a hollow cylindrical shape extending upwardly from the outer circumference of the seat 48A opposite to the cylindrical wall 48B. In view of other aspects, the cylindrical wall 48B forms an annular step at the upper face of the outer circumference of the seat 48A.

The capturer 132 is fixed to the upper face of the seat 48A of the capturer support 48 by, for example, bonding. To facilitate the fixture, a double-faced tape may be present between the capturer 132 and the seat 48A. The circumferential step of the seat 48A abuts at least a part of the outer circumference of the capturer 132, and the annular step facilitates positioning.

The capturer support 48 has the lower face of the seat 48A fixed to the upper end face of the outer cylinder 136 of the fluid dynamic bearing unit 52 by, for example, bonding. In addition, the capturer support 48 has the inner circumference of the cylindrical wall 48B fixed to the outer circumference of the outer cylinder 136 of the fluid dynamic bearing unit 52 by, for example, bonding. In view of other aspects, the capturer support 48 overlaps the rotating body 4 in the axial direction in a space that causes the first gas-liquid interface 124 of the lubricant 20 to be in communication with the disk retaining space 70.

The capturer support 48 is formed by, for example, cutting and machining, pressing, or a combination thereof performed on a metal like stainless steel SUS 303. The capturer support 48 may be formed by molding of other materials like a resin.

(Second Capturer)

With reference to FIG. 2, the chassis 24 has the outer circumference of the protrusion 24E to which the stator core 32 including the coils 30 is fixed. The fluid dynamic bearing unit 52 has the second gas-liquid interface 122 in an area which is surrounded by the stator core 32 and which is a gap between the flange encircling part 18 and the outer cylinder 136 in the radial direction. The second gas-liquid interface 122 is in communication with the disk retaining space 70 through a channel including the core retaining space 80.

The hub 26 of the rotating body 4 includes an annular recess 26M concaved upwardly in the axial direction and formed in an area facing the stator core 32 in the axial direction. The capturer 130 is a ring-shape member as viewed from the top, and is fitted in the annular recess 26M of the hub 26 so as to face the coil 30 in the axial direction. The capturer 130 is fixed to the annular recess 26M by, for example, bonding. The capturer 130 has at least either one of the inner circumference and the outer circumference abutting the side wall of the annular recess 26M. The capturer 130 includes a capturer projection 130B extending downwardly toward the coils 30, and the capturer projection 130B includes an opposing face that faces the coils 30 in the axial direction. The capturer 130 and the coils 30 narrow down the channel in communication with the disk retaining space 70 from the second gas-liquid interface 122.

An explanation will now be given of an operation of the disk drive device 100 employing the above-explained structure. Three-phase drive currents are applied to the coils 30 to rotate the magnetic recording disks 62. When such drive currents flow through the respective coils 30, field magnetic fluxes are generated along the respective salient poles of the stator core 32. Those field magnetic fluxes and the magnetic fluxes by the drive magnetic poles of the magnet 28 apply torque to the magnet 28 by mutual action, and thus the hub 26 and the magnetic recording disks 62 engaged therewith start rotating. While at the same time, when the voice coil motor 66 causes the swing arm 64 to swing, the recording/playing head goes out and comes in the swingable range over the magnetic recording disk 62. The recording/playing head converts magnetic data recorded in the magnetic recording disk 62 into electrical signals, and transmits the signals to a control board (unillustrated), or writes data transmitted in the form of electrical signals from the control board in the magnetic recording disk 62 as magnetic data.

The disk drive device 100 of this embodiment employing the above-explained structure has the following advantageous effects.

According to the disk drive device 100, the capturer projections 130B, 132B of the capturers 130, 132, respectively, narrow down channels causing the disk retaining space 70 to be in communication with the gas-liquid interfaces 122, 124 of the lubricant 20. Hence, the diffusion resistance to the vaporized lubricant 20 from the gas-liquid interfaces 122, 124 increases, thus the vaporized lubricant 20 is not likely to flow to the disk retaining space 70, and the gasified lubricant 20 staying in the respective spaces of the narrowed-down portions above the gas-liquid interfaces are efficiently captured by the capturers 130, 132. Therefore, a diffusion of the vaporized lubricant 20 can be suppressed, thus preventing a contamination of the disk retaining space 70 and a filled gas.

According to the disk drive device 100, the capturer 132 is fixed through the capturer support 48 including the seat 48A and the cylindrical wall 48B, and thus a sufficient fixture strength between the capturer 132 and the seat 48A can be ensured. In addition, when the circumference of the cylindrical wall 48B is enlarged, in comparison with a case in which no cylindrical wall 48B is provided, the fixture strength between the cylindrical wall 48B and the other component can be enhanced. Still further, the seat 48A is provided with an annular step, and the side face of the outer circumference of the capturer 132 abuts this step. Hence, positioning of the capturer 132 relative to the seat 48A becomes easy, thereby improving the attachment precision of the capturer 132.

According to the disk drive device 100, the capturer 130 is fitted in and fixed to the annular recess 26M of the hub 26 of the rotating body 4, and either one of the inner circumference of the capturer 130 and the outer circumference thereof abuts the side wall of the annular recess 26M. Hence, the positioning of the capturer 130 relative to the rotating body 4 becomes easy, and thus an attachment precision of the capturer 130 can be improved.

The structure of the disk drive device 100 and the operation thereof according to this embodiment were explained, but those are merely example, and a combination of the respective structural components can be expanded in various ways, and it should be understood by those skilled in the art that such structures derived from that expansion are within the scope of the present disclosure.

In the aforementioned embodiment, the rotating body 4 is joined with the bearing body 8, and the shaft body 6 is joined with the stationary body 2, but the present disclosure is not limited to such a case. The rotating body 4 may be joined with the shaft body 6, and the bearing body 8 may be joined with the stationary body 2.

In the aforementioned embodiment, the one thrust dynamic pressure generating grooves 54 are formed in the upper face of the sleeve 42, but the present disclosure is not limited to this structure. A structure having no thrust dynamic pressure generating groove may be employed.

In the aforementioned embodiment, the sleeve 42 and the outer cylinder 136 are formed as separate components, but the present disclosure is not limited to this structure. The sleeve 42 and the outer cylinder 136 may be formed integrally. In this case, the communication channel BP may be a through-hole formed in the axial direction.

In the aforementioned embodiment, the shaft body 8 and the hub 26 are formed as separate components, but the present disclosure is not limited to this structure. The shaft body 8 and the hub 26 may be formed integrally.

What is claimed is:

1. A disk drive device comprising:
   a chassis;
   a shaft having both ends thereof fixed, said both ends including a first end fixed to the chassis, and a fixed second end;
   a rotating body on which a recording disk is to be mounted, the recording disk being retained in a disk retaining space formed inside the chassis;

a bearing body that supports the rotating body in a freely rotatable manner relative to the chassis around the shaft; and a lubricant which is applied in a gap between the rotating body and the shaft;

wherein:

the lubricant has a first gas-liquid interface between the rotating body and the shaft at a second-end side in an axial direction of the shaft relative to the chassis; and a first capturer which is annular around the shaft and which comprises a charcoal filter is provided in a space in communication with the disk retaining space from the first gas-liquid interface.

2. The disk drive device according to claim 1, wherein:

the first capturer includes an annular projection that projects upwardly toward a side opposite to the chassis.

3. The disk drive device according to claim 1, wherein the first capturer is disposed so as to cover the first gas-liquid interface.

4. The disk drive device according to claim 1, further comprising a capturer support that supports the first capturer, wherein the capturer support includes:

an annular seat to which the first capturer is fixed; and a cylindrical wall extended toward the chassis from an outer circumference of the seat.

5. The disk drive device according to claim 4, wherein the first capturer is fixed to the bearing body through the cylindrical wall of the capturer support.

6. The disk drive device according to claim 4, wherein the first capturer is fixed to the bearing body through a bottom face of the seat.

7. The disk drive device according to claim 4, wherein the first capturer is fixed to the seat by bonding.

8. The disk drive device according to claim 4, wherein the first capturer is fixed to the seat by a double-faced tape.

9. A disk drive device comprising:

a chassis;

a shaft body including a shaft having both ends thereof fixed, said both ends including a first end fixed to the chassis, and a fixed second end;

a stator core fixed to the chassis around the shaft body, and including coils;

a rotating body on which a recording disk is to be mounted, and which forms a first space that surrounds the stator core, the recording disk being retained in a disk retaining space formed inside the chassis;

a bearing body that supports the rotating body in a freely rotatable manner relative to the chassis around the shaft; and a lubricant which is applied in a gap between the shaft body and the rotating body;

wherein:

the first space is in communication with the disk retaining space; and a capturer which is annular around the shaft body, and which comprises a charcoal filter is provided in the first space.

10. The disk drive device according to claim 9, wherein the capturer is provided on an inner circumference of the rotating body facing the stator core in an axial direction.

11. The disk drive device according to claim 10, wherein:

the capturer includes an annular projection projecting toward the stator core.

12. The disk drive device according to claim 10, wherein the capturer is fitted in and fixed to an annular recess provided in the inner circumference of the rotating body facing the stator core in the axial direction.

13. The disk drive device according to claim 9, wherein:

the lubricant has a gas-liquid interface at a side opposite to the second end of the shaft in an axial direction; and the second capturer is located above the gas-liquid interface in the axial direction.

14. A disk drive device comprising:

a chassis;

a shaft body including a shaft having both ends thereof fixed, said both ends including a first end fixed to the chassis, and a fixed second end;

a rotating body on which a recording disk is to be mounted, the recording disk being retained in a disk retaining space formed inside the chassis;

a bearing body that supports the rotating body in a freely rotatable manner relative to the chassis around the shaft;

a lubricant which is applied in a gap between the rotating body and the shaft body;

wherein:

the lubricant has a gas-liquid interface between the shaft body and the rotating body; and an annular capturer which is annular around the shaft body and which comprises a charcoal filter is provided in a space in communication with the disk retaining space from the gas-liquid interface.

15. The disk drive device according to claim 14, wherein the capturer comprises an annular projection that narrows down a channel in communication with the disk retaining space from the gas-liquid interface.

16. The disk drive device according to claim 14, wherein the capturer comprises:

a first capturer disposed on an upper face of the bearing body at a second-end side of the shaft, and also disposed at a location covering the gas-liquid interface in an axial direction; and a second capturer disposed on a surface of the rotating body, the surface being an internal surface relative to a surface of the rotating body on which the recording disk is to be mounted.

17. The disk drive device according to claim 14, wherein the capturer is located above the gas-liquid interface in the axial direction.

* * * * *